(12) United States Patent
Dhurandhar et al.

(10) Patent No.: US 9,355,367 B2
(45) Date of Patent: May 31, 2016

(54) SYSTEM AND METHOD FOR USING GRAPH TRANSDUCTION TECHNIQUES TO MAKE RELATIONAL CLASSIFICATIONS ON A SINGLE CONNECTED NETWORK

(71) Applicant: International Business Machines Corporation, Armonk, NY (US)

(72) Inventors: Amit Dhurandhar, Somers, NY (US); Jun Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/787,807

(22) Filed: Mar. 7, 2013

(65) Prior Publication Data

US 2014/0258196 A1 Sep. 11, 2014

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 99/00* | (2010.01) |
| *G06N 3/08* | (2006.01) |
| *G06N 5/02* | (2006.01) |

(52) U.S. Cl.
CPC ............... *G06N 99/005* (2013.01); *G06N 3/08* (2013.01); *G06N 5/022* (2013.01)

(58) Field of Classification Search
None
See application file for complete search history.

(56) References Cited

U.S. PATENT DOCUMENTS

| | | | | |
|---|---|---|---|---|
| 2006/0053099 | A1* | 3/2006 | Gardner et al. | 707/3 |
| 2008/0275902 | A1* | 11/2008 | Burges et al. | 707/102 |
| 2009/0132561 | A1* | 5/2009 | Cormode et al. | 707/100 |
| 2011/0010673 | A1 | 1/2011 | Takeda | |
| 2011/0137919 | A1 | 6/2011 | Ryu et al. | |
| 2011/0196870 | A1 | 8/2011 | Schmidtler et al. | |
| 2011/0314367 | A1* | 12/2011 | Chang et al. | 715/230 |
| 2012/0089552 | A1* | 4/2012 | Chang et al. | 706/52 |

FOREIGN PATENT DOCUMENTS

| | | |
|---|---|---|
| WO | 02071243 | 9/2002 |
| WO | 03044728 | 5/2003 |

OTHER PUBLICATIONS

A. B. Goldberg, J. Zhu, and S. Wright. Dissimilarity in graph-based semi-supervised classification. In AISTATS, 2007.*
"Manifold Regularization: A Geometric Framework for Learning from Labeled and Unlabeled Examples" M. Belkin et al; Journal of Machine Learning Research 7 (2006) 2399-2434 Submitted Apr. 2005; Revised May 2006; Published Nov. 6, 2006 Mikhail Belkin, Partha Niyogi and Vikas Sindhwani.*

(Continued)

*Primary Examiner* — Kakali Chaki
*Assistant Examiner* — Luis Sitiriche
(74) *Attorney, Agent, or Firm* — Whitham Curtis Christofferson & Cook, PC; Daniel P. Morris

(57) ABSTRACT

A system and method for extending partially labeled data graphs to unlabeled nodes in a single network classification by weighting the data with a weight matrix that uses a modified graph Laplacian based regularization framework and applying graph transduction methods to the weighted data. The technique may be applied to data graphs that are directed or undirected, that may or may not have attributes and that may be homogeneous or heterogeneous.

13 Claims, 5 Drawing Sheets

(56) References Cited

OTHER PUBLICATIONS

Sindhwani et al.; "Document-Word Co-Regularization for Semi-supervised Sentiment Analysis"; Eighth IEEE International Conference on Data Mining, 2008, entire article.

Bhagat et al.; "Node Classification in Social Networks"; Social Network Data Analytics, Springer US, Jan. 17, 2011, pp. 115-148.

Erdem et al.; "Graph Transduction as a Non-Cooperative Game"; Neural Computation, vol. 24, No. 3, Mar. 2012, pp. 700-723.

Duch et al.; "A framework for similarity-based methods"; Second Polish Conference on Theory and Applications of Artificial Intelligence, Sep. 28-30, 1998, pp. 33-60.

Wang et al.; "Graph Transduction via Alternating Minimization"; Proceedings of the 25th International Conference on Machine Learning, Helsinki, Finland, 2008, entire article.

Liu et al.; "Robust and Scalable Graph-Based Semisupervised Learning"; Proceedings of the IEEE, Fol. 100, No. 9, Sep. 2012, pp. 2624-2638.

Xianjin Zhu; "Semi-Supervised Learning with Graphs"; Doctoral Dissertation, Carnegie Mellon University, Pittsburgh, PA, May 2005, pp. 1-164.

\* cited by examiner

SYSTEM AND METHOD FOR USING GRAPH TRANSDUCTION TECHNIQUES TO MAKE RELATIONAL CLASSIFICATIONS ON A SINGLE CONNECTED NETWORK

BACKGROUND OF THE INVENTION

1. Field of the Invention

The present invention generally relates to techniques for statistical relational learning, and more particularly to techniques for making relational classifications on a single connected network.

2. Background Description

Given the prevalence of large connected relational graphs across diverse domains, single or within network classification has been one of the popular endeavors in statistical relational learning (SRL) research. Ranging from social networking websites to movie databases to citation networks, large connected relational graphs are banal. In single network classification, we have a partially labeled data graph and the goal is to extend this labeling, as accurately as possible, to the unlabeled nodes. The nodes themselves may or may not have associated attributes. An example where within network classification could be useful is in forming common interest groups on social networking websites. For instance, a group of people in the same geography may be interested in playing soccer and they would be interested in finding more people who are likely to have the same interest. In a different domain such as entertainment, one might be interested in estimating which of the new movies is likely to make a splash at the box office. Based on the success of other movies that had some of the same actors and/or the same director, one could provide a reasonable estimate of which movies are most likely to be successful.

Many methods that learn and infer over a data graph have been developed in SRL literature. Some of the more effective methods perform collective classification, that is, besides using the attributes of the unlabeled node to infer its label, they also use attributes and labels of related nodes/entities. These are thus a generalization of methods that assume that the data is independently and identically distributed (i.i.d.). Examples of such methods are relational Markov networks (RMNs), relational dependency networks (RDNs), Markov logic networks (MLNs), and probabilistic relational models (PRMs). These all fall under the umbrella of Markov networks. There have been simpler models suggested as baselines, such as relational neighbor classifiers (RN) which simply choose the most numerous class label amongst their neighbors to more involved variants such as those using relaxation labeling. Interestingly, these simple models perform quite well when the auto-correlation is high, even though the graph may be sparsely labeled. Recently, a pseudo-likelihood expectation maximization (PL-EM) method was introduced, which seems to perform favorably to other methods when the graph has a moderate number (around 20-30%) of labeled nodes.

A different class of methods that could potentially address the problem at hand are graph transduction methods, which are a part of semi-supervised learning methods and in some sense are the i.i.d. counterpart of relational methods. These methods typically perform well when we are given a weighted graph and the linked nodes have mostly the same labels—unless apriori dissimilar nodes are explicitly specified—, even if only a small fraction of the labels are known. If a weighted graph is not readily available, it is constructed from the (explanatory) attributes of the nodes. If an unweighted graph with no attributes is given, then the adjacency matrix is passed as input.

In relational learning, the graphs are typically unweighted and sometimes may not have attributes. In many cases, the attributes may not accurately predict the labels, in which case, weighting the edges solely on them may not provide acceptable results. The links could be viewed as an additional source of information to determine labels amongst connected nodes. Thus, the weights should also be functions of the known labeling. Some of these intuitions are captured in the relational gaussian process model, but it is limited to undirected graphs and the suggested kernel function is not easy to adapt to relational settings where we may have heterogeneous data.

SUMMARY OF THE INVENTION

The present invention provides a lucid way to effectively leverage a rich class of graph transduction methods, namely those based on the graph Laplacian regularization framework, to make within network relational classifications. Among the existing graph transduction methods, this class of methods is considered to be one of the most efficient and accurate in real applications. In particular, the invention provides a procedure to learn a weight matrix for a graph that may be directed or undirected, that may exhibit positive or negative auto-correlation and where the edges in the graph may be between labeled nodes, between unlabeled nodes or between a labeled and an unlabeled node.

The inventive methodology first provides a solution for a graph where nodes have no attributes, only class labels. We then extend the solution to include attributes (and heterogenous data) by incorporating a conical weighting scheme that weighs importance of the links relative to the attributes. The construction of the weight matrix assumes binary labeling. However, recursive application of the chosen graph transduction method with reconstruction of the weight matrix will accomplish multi-class classification as is shown in the experiments on real data in connection with FIGS. 8A and 8B.

When we have a connected unweighted homogeneous/heterogeneous graph that is partially labeled, the goal is to propagate the labels to the unlabeled nodes. In this disclosure, we provide a different perspective on this problem by enabling the effective use of graph transduction techniques. We accomplish this by providing a novel procedure for constructing a weight matrix that serves as input to a rich class of graph transduction techniques. Our procedure has multiple desirable properties. For example, the weights it assigns to edges between unlabeled nodes naturally relate to a measure of association commonly used in statistics, namely the Gamma test statistic. We further portray the efficacy of our approach on synthetic as well as real data, by comparing it with state-of-the-art relational learning algorithms, and graph transduction techniques using a binary adjacency matrix or a real valued weight matrix computed using available attributes as input. In these experiments we see that our approach consistently outperforms other approaches when the graph is sparsely labeled, and remains competitive with the best when the proportion of known labels increases.

The invention provides a method and system for extending a partially labeled data graph to unlabeled nodes in a single network classification. The invention operates by constructing a weight matrix for data in a single network classification, applying the weight matrix to the data, and then applying a graph transduction method to the weighted data to generate labels for the unlabeled nodes. In one implementation the weight matrix uses a modified graph Laplacian based regularization framework. In one aspect of the method and system, the edges of the data graph are partitioned into categories, weights are assigned to each category, and each edge is assigned the weight of its respective category. In another implementation the categories are edges between nodes with the same label, edges between nodes with opposite labels, edges between unlabeled nodes, edges between an unlabeled node and a node with a label 1, and edges between an unlabeled node and a node with a label −1.

It is also an aspect of the invention to assign weights to edges between unlabeled nodes, where the assigned weight denotes an expectation based on a distribution of edges that have labels. In a variation on this implementation, edges between an unlabeled node and a labeled node are assigned a weight denoting an expectation based on a distribution of edges that have labels, where the distribution is limited to those edges having one node equal to the labeled node. A further variation on this implementation is to assign to each edge a weight that is a conical combination of a weight based on the respective category and a weight based on affinity of attribute values of nodes connected by the edge. In yet another implementation, applying a graph transduction method is accomplished by imposing a tradeoff between a fitting accuracy of a prediction function on labeled data and a smoothness of the prediction function over the graph. It is a further aspect of the invention to estimate the smoothness of the prediction function for the graph Laplacian based regularization framework, and modifying the prediction function to ensure compatibility between the graph transduction method and the graph Laplacian based regularization framework.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The notation used in this disclosure is described in the following table, where graph type "D" is directed and graph type "U" is undirected:

TABLE 1

| Symbol | Graph Type | Symantics |
|---|---|---|
| $N_q$ | D and U | Number of nodes with label q |
| $N_{qr}$ | D | Number of edges from node with label q into node with label r |
| $N_{qr}$ | U | When q = r, Number of edges between node with label q and node with label r When q /= r, Half of the number of edges between node with label q and node with label r |
| $N_p$ | D and U | Total number of labeled edges i.e. edges where both nodes are labeled |
| $P_{same}$ | D and U | Ratio of the number of edges between nodes with same label to total number of labeled edges |
| $P_{opp}$ | D and U | Ratio of the number of edges between nodes with different labels to total number of labeled edges |
| D | D and U | Distribution over labeled edges |

Weight Matrix Construction

Figure 1:
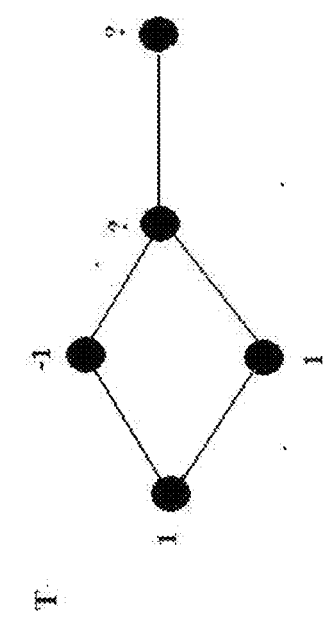
FIG. 1 is an example input graph (T) to the invention's construction method.

In this section we elucidate a way of constructing the weight matrix for a partially labeled graph G(V, E) where V is the set of nodes and E the set of edges. We assume that the labeling is binary, i.e. any labeled node i has a label $Y_i \in \{1,-1\}$. As mentioned before, the procedure of constructing the weight matrix W, which serves as input to a graph transduction technique, could be applied recursively or iteratively to each (binary) classified portion, to attain multi-class classification. Hence, the input in any run to our weight matrix construction method is a partially (binary) labeled graph as shown in FIG. 1.

Given our setup, a partially labeled graph G has 3 types of nodes and consequently 9 types of edges for a directed graph while 6 types of edges for an undirected one. A node could be labeled 1 or −1 or may be unlabeled. An edge could be between two nodes with the same label (i.e. (1→1) or (−1→−1)) or between two oppositely labeled nodes (i.e. (1→−1) or (−1→1)) or between a labeled and unlabeled node (i.e. (1→?) or (−1→?) or (?→1) or (?→−1)) or between two unlabeled nodes (i.e. (?→?)). An undirected example graph T is shown in FIG. 1. Our task then is to assign weights to each of these types of edges.

Notation

Before we describe the weights we assign to the different types of edges, we introduce some notation. Given a graph G, let $N_q$ denote the number of nodes with label q. Let $N_{qr}$, denote the number of edges from node with label q into node with label r. In an undirected graph, this would be the number of edges between nodes labeled q and r, if q=r. If q≠r, then $N_{qr}$ would be half of the number of edges between q and r. Notice that $N_{qr}$ for q≠r could thus be a float, but we do this to make the formulae in this paper consistent irrespective of whether we have a directed or an undirected graph. Let $N_p$ denote the total number of labeled edges, i.e. the total number of edges where both nodes are labeled. In other words, $N_p = N_{11} + N_{-11} + N_{1-1} + N_{-1-1}$. With this let, $$P_{same} = \frac{N_{11} + N_{-1-1}}{N_p}, \quad (1)$$

$$P_{opp} = \frac{N_{1-1} + N_{-11}}{N_p}$$

Hence, $P_{same} + P_{opp} = 1$. We denote this empirical distribution derived from labeled edges by D. A summary of this notation for directed and undirected graphs is shown in Table 1.

Assignment of Weights

We now describe our weight matrix construction which applies to both directed and undirected graphs. We partition the types of edges into five categories and suggest a way of assigning weights to edges in each of these categories.

Edges between nodes with the same label: If an edge is between nodes having the same label, that is if node i and node j have the same label, we assign a weight $W_{ij} = P_{same}$ to that edge. This makes intuitive sense since we want to weigh the edge based on how likely it is to have nodes with the same label being connected.

Edges between nodes with opposite/different labels: If an edge is between nodes with opposite labels, that is if node i and node j have different labels, we assign a weight $W_{ij} = -P_{opp}$ to that edge. This is also intuitive since we want to weigh the edge based on how likely it is to have nodes with opposite labels connected. We assign a negative sign since simply assigning the magnitude will not create a distinction between nodes labeled alike and those with different labels.

Edges between unlabeled nodes: If an edge is between unlabeled nodes, that is if node i and node j do not have labels, we assign a weight $W_{ij} = E_D[Y_i, Y_j]$ to that edge. $E_D[Y_i, Y_j]$ denotes the expectation of labeled edges over the distribution D. $Y_i$ and $Y_j \in \{1, -1\}$ and hence, $$\begin{aligned} E_D[Y_i, Y_j] &= \sum_{q,r \in \{1,-1\}} qr P[Y_i = q, Y_j = r] \quad (2) \\ &= P[Y_i = 1, Y_j = 1] - P[Y_i = 1, Y_j = -1] + \\ &\quad P[Y_i = -1, Y_j = -1] - P[Y_i = -1, Y_j = 1] \\ &= \frac{N_{11}}{N_P} - \frac{N_{1-1}}{N_P} + \frac{N_{-1-1}}{N_P} - \frac{N_{-11}}{N_P} \end{aligned}$$

Since we do not know the labels of any of the nodes for edges in this category, we assign our most unbiased estimate which is the indicated expected value.

Edges between an unlabeled node and a node with label 1: If an edge is between an unlabeled node and a node with label 1, we assign a weight $W_{ij} = E_D[Y_i | Y_j = 1]$ to that edge. Here $Y_i \in \{1, -1\}$. In this case, $$E_D[Y_i | Y_j = 1] = \frac{N_{11}}{N_1} - \frac{N_{-11} + N_{1-1}}{N_1} \quad (3)$$

is our unbiased estimate given that one of the nodes has a label of 1.

Edges between an unlabeled node and a node with label -1: If an edge is between an unlabeled node and a node with label -1, we assign a weight $W_{ij} = E_D[Y_i | Y_j = -1]$ to that edge. Here $Y_i \in \{1,-1\}$. In this case, $$E_D[Y_i | Y_j = -1] = \frac{N_{-1-1}}{N_{-1}} - \frac{N_{-11} + N_{1-1}}{N_{-1}} \quad (4)$$

is our unbiased estimate given that one of the nodes has a label of -1.

Figure 2:
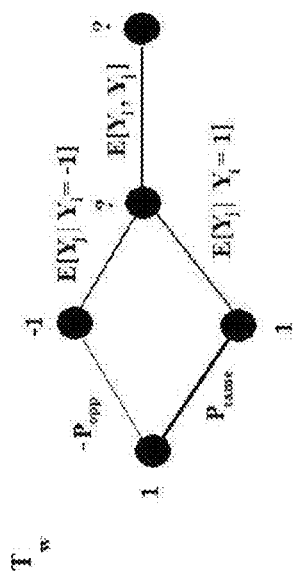
FIG. 2 is a weighted version $T_w$ of graph T shown in FIG. 1.

A weighted version of our example graph T in FIG. 1, is shown by graph $T_w$ in FIG. 2.

Characteristics of Matrix Construction

In the previous section, we elucidated a way of constructing a weight matrix for a partially labeled graph. In this section, we discuss certain characteristics of this construction. We discuss aspects such as relationships of the suggested weights to standard statistical measures and the tendencies of the weight matrix as a function of the connectivity and labeling in the graph. As we will see, our construction seems to have desirable properties.

Relation to Standard Measures of Association

In the previous section, we described and provided a brief justification of the procedure to assign weights. It turns out that the weights we assign to edges that have at least one unlabeled node, besides being unbiased, have more (statistical) semantics.

Proposition 1. The weights assigned to edges between unlabeled nodes i.e. $E_D[Y_i, Y_j]$, equate to the gamma test statistic ($\rho$) in the relational setting.

Proof. From equation 2 we have, $$\begin{aligned} E_D[Y_i, Y_j] &= \frac{N_{11}}{N_P} - \frac{N_{1-1}}{N_P} + \frac{N_{-1-1}}{N_P} - \frac{N_{-11}}{N_P} \\ &= \frac{1}{N_P}(N_{11} + N_{-1-1}) - \frac{1}{N_P}(N_{-11} + N_{1-1}) \\ &= P_{same} - P_{opp} \\ &= \rho \end{aligned}$$

The gamma test statistic $\rho$, is a standard measure of association used in statistics. The value of this statistic ranges from $[-1, 1]$, where positive values indicate agreement, negative values indicate disagreement/inversion and zero indicates absence of association. The statistic was historically used to compare the sorted order of observations based on values of two attributes. Recently, however, it has been suggested as a metric to measure auto-correlation in relational data graphs. Hence, our assignment of weight to edges between unlabeled nodes is the auto-correlation in the graph, which makes intuitive sense.

The weights assigned to edges with one labeled and one unlabeled node i.e. $E_D[Y_i | Y_j = 1]$ or $E_D[Y_i | Y_j = -1]$, based on equations 3 and 4 can be written as: $(P_{same}|1) - (P_{opp}|1) = \rho 1$ and $(P_{same}|-1) - (P_{opp}|-1) = \rho -1$. These could be considered as gamma test statistics conditioned on one particular type of label and could be referred to as conditional gamma test statistics.

Behavior of Weight Matrix

We now analyze the behavior of the weight matrix as the labeled edges in our input graph tend towards only connecting nodes with the same labels or analogously only connecting nodes with different labels.

As our input graph tends to have only nodes with same labels being connected, it has the following effect on our weight matrix. The weight of edges between nodes with the same label tends to one, i.e. $P_{same} \to 1$. The weight of edges between nodes with different labels tends to zero, i.e.

Figure 3:
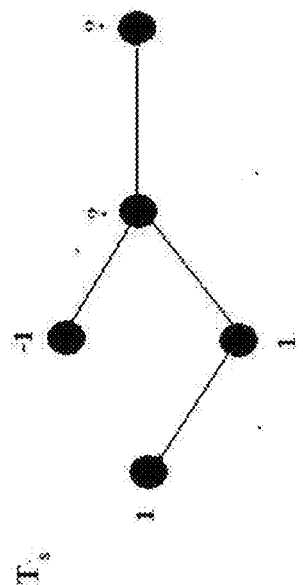
FIG. 3 shows instantiation of graph $T_w$ when the labeled edges have only nodes with the same labels.

$-P_{opp} \to 0$. The weight of edges between unlabeled nodes tends to 1, i.e. $\rho \to 1$. The weight of the remaining set of edges also tends to one, i.e. $\rho 1, \rho-1 \to 1$. Hence, in this situation the weight matrix becomes an adjacency matrix in the extreme case, with different labeled edges vanishing (i.e. being weighted 0) and all other edges getting a weight of one. Consequently, our example weighted graph $T_w$ in FIG. 2 becomes graph $T_s$ in FIG. 3.

Figure 4:
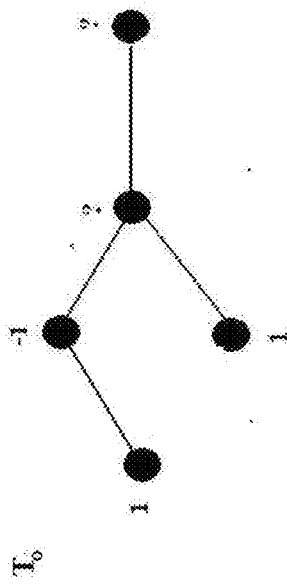
FIG. 4 shows instantiation of graph $T_w$ when the labeled edges have only nodes with different labels.

As our input graph tends to have only nodes with different labels being connected, it has the following effect on our weight matrix. The weight of edges between nodes with the same label tends to zero, i.e. $P_{same} \to 0$. The weight of edges between nodes with different labels tends to $-1$, i.e. $-P_{opp} \to -1$. The weight of edges between unlabeled nodes tends to $-1$, i.e. $\rho \to -1$. The weight of the remaining set of edges also tends to $-1$, i.e. $\rho 1. \rho-1 \to -1$. Since the graph in the extreme case has no positive weights, the negative sign in the weights is superfluous and can be eliminated. Hence, in this situation too the weight matrix becomes an adjacency matrix in the extreme case, with same labeled edges vanishing (i.e. being weighted 0) and all other edges getting a weight of one. Consequently, our example weighted graph $T_w$ in FIG. 2 becomes graph $T_o$ in FIG. 4.

We thus have $T_s \cup T_o = T$, and the labeled edges in $T_s$ and $T_o$ complement each other on the labeled portion with respect to the base graph T. We intuitively expect the labeled edges between differently labeled nodes to slowly disappear while the other edges remain present, as edges connecting nodes with the same label become predominant. We also expect analogous behavior for the diametric case. As we have seen, these intuitions are captured implicitly, in our modeling of the weight matrix, thus making the construction procedure more acceptable.

Extensions

In the previous sections, we described a procedure for constructing the weight matrix for a partially labeled graph with no attributes. In this section, we extend the weighting scheme to include attribute information. Moreover, we also present a solution to handle data heterogeneity using ideas from relational learning.

Modeling with Attributes

For data graphs that have attributes, we want to be able to leverage this information in addition to the information learned from the connectivity of the graph, so as to possibly further improve the performance of our procedure. In particular, we need to extend our weight assignment procedure to be able to encapsulate attribute information. A simple way of combining the already modeled connectivity information with the attributes, is to assign a weight to an edge that is a conical combination of the weight based on connectivity and a weight based on the affinity of attribute values of the connected nodes. Hence, if $w_c$ is the weight assigned based on the connectivity for the particular edge type and $w_a$ is the weight assigned based on attributes, then $\lambda w_c + \mu w_a$ is the new weight of that edge, where $\mu, \lambda \geq 0$. $w_c$ is essentially a weight assignment described above (in the Assignment of Weights subsection), viz. $P_{same}$ or $\rho$ etc. $w_a$ is a function of the attributes of the nodes connected by the corresponding edge, which we will soon define. $\mu$ and $\lambda$ are parameters which can be determined through standard model selection techniques such as cross-validation. A reasonable indicator for the value of $\lambda$ could be the absolute value of the auto-correlation in the graph. While a reasonable estimate of the value of $\mu$ could be the absolute value of the cross-correlation between $w_a$ and the labeling of the corresponding nodes, i.e. if the labels are the same or different.

In the absence of attributes, our weight assignment $w_c$ for any type of edge, has a value in the interval $[-1, 1]$. To effectively combine the aforementioned two sources of information, $w_a$ needs to be of the same scale as $w_c$. One obvious choice could be cosine similarity which is commonly used in text analytics. Cosine similarity lies in $[-1, 1]$, where values close to 1 imply that the nodes are similar while values close to $-1$ imply that the nodes are dissimilar. Other choices could be kernel functions (K) such as Gaussian kernel, which normalize popular distance metrics such as Euclidean distance and other $l_p$ norms to value in $[0, 1]$. Here, values close to 1 imply similarity and values close to 0 imply dissimilarity. This range can be easily transformed to our usual range of $[-1,1]$ with the same symantics as before, by a simple linear transformation of the form, $2K-1$.

Modeling with Heterogeneous Data

If the data graph has multiple types of entities, resulting in different types of nodes, the procedure previously described cannot be directly applied to construct the weight matrix. In such cases, standard relational learning strategies such as collapsing portions of the graph and using aggregation can be applied to reduce to a graph with a single type of node with attributes. To this new graph the above extended procedure can be applied.

Figure 5B:
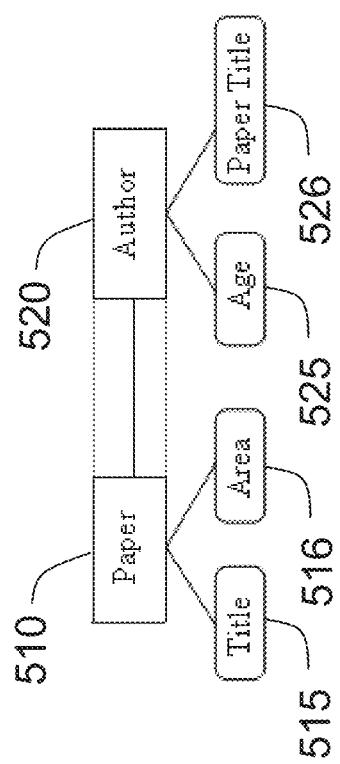
FIG. 5B is the corresponding data graph which shows authors linked to the papers that they authored or co-authored.
Figure 5A:
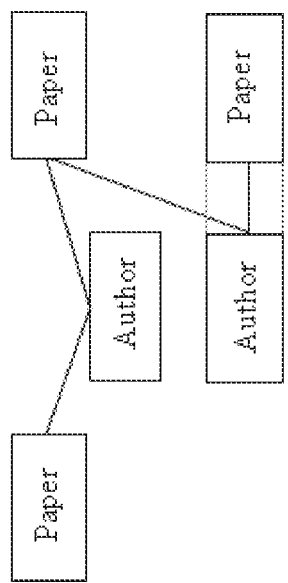
FIG. 5A represents a relational schema with node types Paper and Author, where the relationship between them is many-to-many.
Figure 6B:
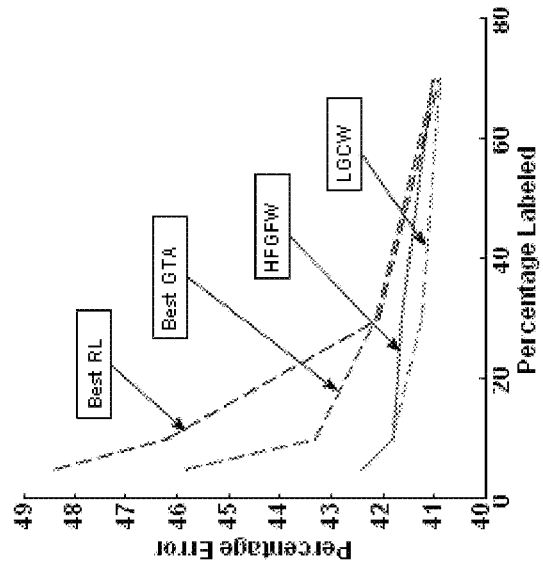
FIG. 6B is a set of graphs generated by applying the inventive method to preferential attachment synthetic data where the auto-correlation is low.
Figure 6A:
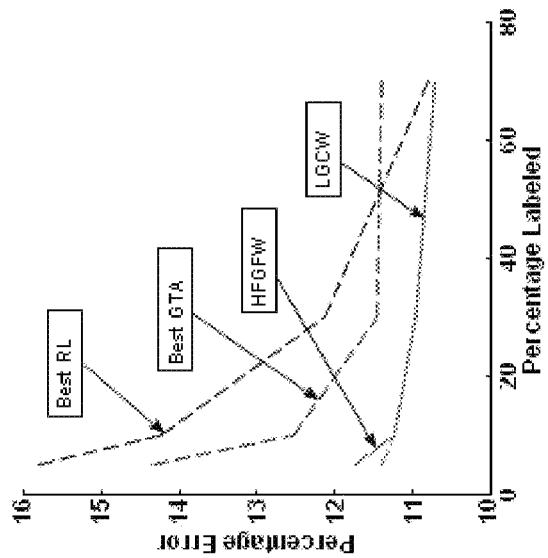
FIG. 6A is a set of graphs generated by applying the inventive method to preferential attachment synthetic data where the auto-correlation is high.
Figure 7B:
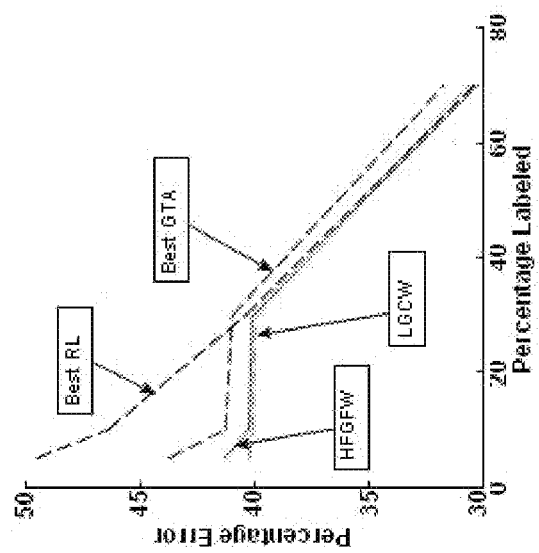
FIG. 7B is a set of graphs generated by applying the inventive method to forest fire synthetic data where the auto-correlation is low.
Figure 7A:
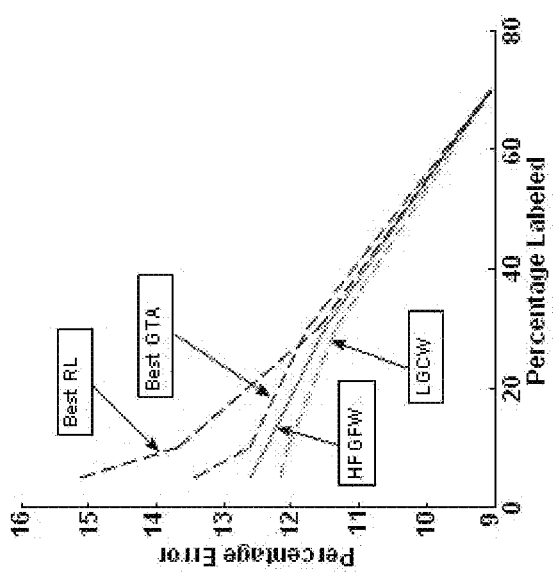
FIG. 7A is a set of graphs generated by applying the inventive method to forest fire synthetic data where the auto-correlation is high.

For instance, in a citation graph we may have authors linked to papers, with papers having multiple authors and vice-versa. An example of this is shown in FIGS. 5A and 5B. In FIG. 5A, we see that the node type Paper 510 has two attributes, Title 515 and Area 516, which denote the title of the paper and the research area it belongs to, respectively. Let the attribute Area 516 be the class label, i.e. we want to classify papers based on their research area. The node type Author 520 has attributes Paper Title 525 and Age 526, which relates a particular paper to the ages of the authors that wrote it. The Title 515 attribute (a primary key) in Paper 510 is the same as the Paper Title 526 attribute (a foreign key) in Author 520. Hence, each Paper 510 node has three attributes namely; Title 515, Area 516 and Age 525. The attributes Title 515 and Area 516 are called intrinsic attributes as they belong to node type Paper 510 and the attribute Age 525 is called a relational attribute since it belongs to a different linked node type Author 520. Each paper can have variable number of authors and thus each paper would be associated with multiple values of Age 525. A popular solution to this problem is to aggregate the values of the attribute Age 525 of Author 520 into a single value such that each paper is associated with only a single Age 525 value. An aggregation function such as average over the ages of the related authors for each paper can be used. Now instead of the Age 525 attribute we can introduce a new attribute AvgAge which denotes average age. With this the attributes of Paper node are; Title, Area and AvgAge. Linking authors that co-authored a paper, we now have a data graph that links only the Paper node type, with each node having two attributes and a class label.

If we have heterogeneous link types, then the described procedures can be applied independently to graphs formed from each link type and the final result could be obtained by aggregating the individual decisions through standard ensemble label consolidation techniques such as taking a majority vote or a weighted majority based on the corresponding auto-correlations.

Compatibility with Graph Transduction Techniques

Graph based transductive learning approaches impose a trade off between the fitting accuracy of the prediction function on labeled data and the smoothness of the function over the graph. Typically, the smoothness measure of a prediction function f over the graph G is calculated as:

$$\|f\|_G^2 = \sum_i \sum_j W_{ij}\|f(x_i) - f(x_j)\|^2 = \frac{1}{2}f(X)^T Lf(X) \quad (5)$$

where $W_{ij}$ is the weight of the edge between nodes $x_i$ and $x_j$, X is the input matrix denoting the nodes, $f(x_i)$ is the label of node $x_i$, $f(X)=[f(x_1), \ldots, f(x_n)]^T$ if there are n nodes and L is the graph Laplacian of G.

Given the above measure of function smoothness, a graph Laplacian based regularization framework estimates the unknown function $f$ as follows:

$$f^{opt} = \arg\min Q(X_l, Y_l, f) + \eta \|f\|_G^2 \quad (6)$$

where $Q(X_l, Y_l, f)$ is a loss function measuring the accuracy over the labeled set $(X_l, Y_l)$. For example, $Q(X_l, Y_l, f) = \|f(X_l) - Y_l\|^2$ i.e. squared loss, is a popular choice.

A weight matrix constructed using our method cannot directly be passed as input to this graph regularization framework. This is because, the smoothness measure using the graph Laplacian is based on the assumption that connected nodes tend to have the same class labels and hence the weights have to be non-negative (i.e. $W_{ij} \geq 0 \; \forall i, j$). However, it is well-known that edges in relational networks could connect nodes with different labels, which would lead to our construction method assigning negative weights to such edges. An example is the WEBKB dataset, described in *Proceedings of the fifteenth national/tenth conference on Artificial intelligence/Innovative applications of artificial intelligence*, by M. Craven et al., AAAI, pages 509-516 (American Association for Artificial Intelligence, 1998), where student nodes are typically connected to faculty nodes more than other student nodes. To ensure compatibility with the graph Laplacian based regularization framework, we make the following modification:

$$\|f\|_G^2 = \sum_i \sum_j W_{ij}\|f(x_i) - sgn(W_{ij})f(x_j)\|^2 \quad (7)$$

$$= \frac{1}{2}f(X)^T Mf(X)$$

similar to the one described in the article "Dissimilarity in graph-based semi-supervised classification" by L. Getoor et al. in *Artificial Intelligence and Statistics (AISTATS)*, 2007, where $\tilde{W}_{ij} = |W_{ij}|$, the degree matrix $\tilde{D} = \{\tilde{D}_{ij}\}$ is computed as $\tilde{D}_{ii} = \Sigma_j \tilde{W}_{ij}$, $M = (\tilde{D} - \tilde{W}) + (1 - sgn(W)) \circ W$ and the symbol $\circ$ is the Hadamard product. With this new smoothness measure, we can now pass our constructed weight matrix as input to this rich class of graph transduction methods.

Experiments

In the previous sections, we described a method to construct a weight matrix for relational data that serves as input to a rich class of graph based transductive learning algorithms. In this section, we assess the efficacy of our approach through empirical studies on synthetic and real data. In these studies, we compare methods across three broad categories, namely: a) sophisticated relational learning (RL) methods, b) sophisticated graph transduction methods with the weight matrix computed using available attributes or adjacency matrix (if no attributes) as input (GTA) and c) relational transductive methods where our learned weight matrix is passed as input to (enhanced/modified) graph transduction techniques. The situations where methods in category c) perform favorably to methods in the other two categories would be the conditions under which use of our procedure would be justified. The relational learning methods we consider are: MLNs, RDNs, PL-EM and RN. The graph transduction methods we consider are: local global consistency (LGC) method (as described in the article "Pseudolikelihood em for within-network relational learning" by R. Xiang et al. in *Proceedings of the 2008 Eighth IEEE International Conference on Data Mining*, pages 1103-1108, published by IEEE Computer Society, Washington, D.C., USA) and harmonic functions Gaussian fields (HFGF) method (as described in the article "Semi-supervised learning using Gaussian fields and harmonic functions" by X. Zhu et al. in *Proceedings of ICML*, pages 912-919, 2003).

In all of our experiments, we vary the percentage of known labels for training from 5% to 10% to 30% to 70%. The errors for each of the methods are obtained by randomly selecting (100 times) the labeled nodes for the specified proportions followed by averaging the corresponding errors. To avoid clutter in the figures reporting the results, we plot only the following four curves (rather than eight), the best performance at each labeled percentage of methods in category a) (BEST RL),
the best performance at each labeled percentage of methods in category b) (BEST GTA),
the LGC method with our constructed weight matrix as input (LGCW) and
the HFGF method with our constructed weight matrix as input (HFGFW) i.e. methods in category c).

Synthetic Experiments

We generate graphs using well accepted random graph generation procedures that create real world graphs, namely: forest fire (as described in the article "Graph evolution: Densification and shrinking diameters" by J. Leskovec et al. in *ACM Trans. Knowl. Discov. Data*, 1(1):2, 2007), and preferential attachment (as described in the article "Emergence of scaling in random networks" by A. Barabasi et al. in *Science*, 286:509-512, 1999). These procedures add one node at a time and as nodes get added, we assign a label to it based on an intuitive label generation procedure which is described below.

Setup

We generate graphs consisting of 1000 nodes for the two generation techniques mentioned above. The parameter settings for forest fire (forward probability=0.37, backward probability=0.32) and preferential attachment (exponent $\beta$=1.6) are derived from the above cited articles which indicate that these settings lead to the most realistic graphs.

On the labeling front, we generate a binary labeling $\epsilon \{1, -1\}$ by a simple procedure for each of these graphs. Whenever a new node is added, with probability p we assign the majority class amongst its labeled neighbors and with probability 1−p we assign one of the two labels uniformly at random. Hence, the labels generated are dependent on the particular graph generation procedure and consequently the connectivity of the graph, as is desired. It's easy to see that as p→1 the auto-correlation in the graph increases, leading to more homogeneity or less entropy amongst connected nodes. For each of the two graph generation procedures, we create graphs where p is low (i.e. 0.3) and where p is high (i.e. 0.8). The low p leads to an auto-correlation of about 0.2 (i.e. $\rho \approx 0.2$) while the high p leads to an auto-correlation of about 0.7 (i.e. $\rho \approx 0.7$), which are calculated from the generated graphs.

Observations

From FIGS. 6A, 6B, 7A and 7B we see that given a particular graph generation procedure—irrespective of the level of auto-correlation—the relative performance of the three different classes of methods is qualitatively similar. GTAs are known to perform particularly well when only a few nodes are labeled and this is confirmed in our experiments. As the percentage of known labels increases however, the relational learning methods start performing better than standard graph transduction techniques. This is probably due to the fact that most sophisticated relational learning methods have low bias and relatively high variance. However, with increasing number of labeled nodes this variance drops rapidly.

The interesting result, however, is that our weight matrix construction technique seems to capture enough of the complexity of the labeling and the network structure that besides performing exceedingly well when the graph is sparsely labeled, it remains competitive with relational learning methods when the percentage of known labels is moderate to high.

Real Data Experiments

For experiments on real data we choose two datasets, namely: WEBKB and a real industrial dataset, BREAD, obtained from a large consumer retail company.

Setup

The WEBKB dataset has a collection of webpages obtained from computer science departments of four US universities. Each webpage belongs to one of seven categories namely; course, faculty, student, staff, project, department or other. The "other" category webpages were not used as input in the classification task, but were used to link webpages in the remaining six classes as described in the article "Classification in networked data: A toolkit and a univariate case study" by S. Macskassy et al. in *J. Mach. Learn. Res.*, 8:935-983, 2007. We performed experiments on the four graphs formed—one for each university—and computed the average error over the four universities for each of the learning methods.

The BREAD dataset has sales information about bread products sold in different stores in the northeastern United States. The dataset has information from 2347 stores. For each store we know its location, we know if the store met or underachieved its target quarterly sales, we know the amounts it had on promotion during that period, we know the quantity ordered during that period and we know the amount reclaimed during that period. Based on location, we can form a graph linking the closest stores together. With this, we have a dataset of size 2347 and where each node in the graph has four attributes. Setting the attribute indicating whether the sales met or underachieved the expected amount as our class label, we obtain a graph where each node has three explanatory attributes.

Observations

Figure 8B:
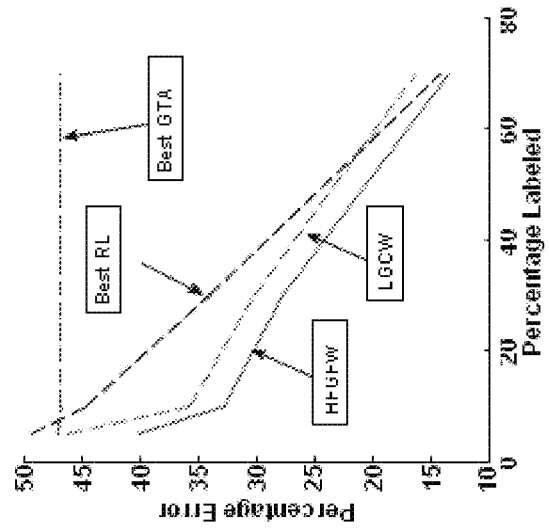
FIG. 8B is a set of graphs generated by applying the inventive method to a collection of sales information about bread products known as the BREAD dataset.
Figure 8A:
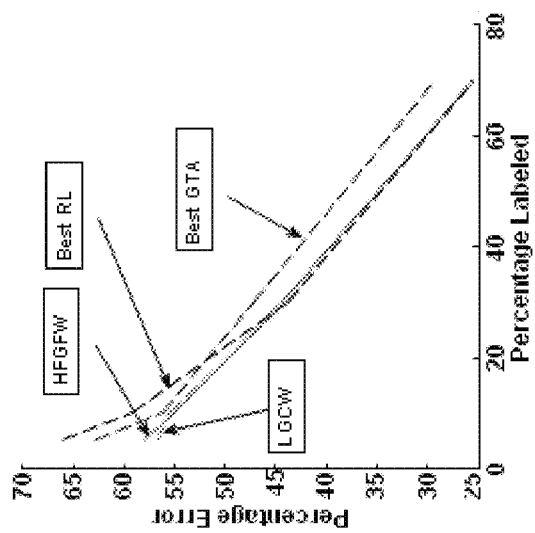
FIG. 8A is a set of graphs generated by applying the inventive method to a collection of web pages known as the WEBKB dataset.

On the WEBKB dataset we see in FIG. 8A that the best GTA is better than the relational methods when a small percentage (<20%) of labels are known, but the relational methods quickly close this gap and start outperforming the GTAs with more label information. Our weight matrix construction method however, performs better than the other two classes of methods at low label proportions and remains competitive with the relational methods as this proportion increases, unlike the GTAs. This favorable behavior can most likely be attributed to our method being able to effectively model the strength (i.e. the numerical value) and direction (i.e. + or −) of dependencies between linked entities, something GTAs seemingly fail to capture.

On the BREAD dataset we see in FIG. 8B that the GTAs are much worse than the other class of methods. A possible reason for this is that stores near to one another typically compete with each other for the same type of products and hence, our input graph exhibits strong negative auto-correlation. Since GTAs predominantly model similarity between linked entities, their performance is practically unchanged even when the percentage of known labels is increased. The relational methods perform much better than GTAs in this setting. In contrast to GTAs, they effectively capture the dissimilarity between linked nodes as the number of known labels increases. However, our weight matrix construction method seems to capture this relationship much earlier with only a small percentage of labels known.

DISCUSSION

In this disclosure, we have provided a simple yet novel way of constructing a weight matrix for partially labeled relational graphs that may be directed or undirected, that may or may not have attributes and that may be homogeneous or heterogeneous. We have described the manner in which such a weight matrix can serve as input to a rich class of graph transduction methods through a modified graph Laplacian based regularization framework. We have portrayed the desirable properties of this construction method and showcased its effectiveness in capturing complex dependencies through experiments on synthetic and real data.

In the future, it would be interesting to extend this procedure to perform multi-class classification in a single shot, rather than having to perform multiple binary classification tasks. This would most likely improve the actual running time, though not necessarily the time complexity in terms of $O(.)$. On the theory side, it might be of some interest to analyze the synthetic label generation procedure introduced in this paper, for different types of graphs. One could use ideas from the theory of random walks to determine tendencies of the label generation procedure. From a learning theory perspective, one could potentially derive error bounds as functions of p (amongst other parameters), and if one were to express p in terms of auto-correlation $\rho$, one would have error bounds as functions of $\rho$. This would be of some interest since $\rho$ can be computed from static graphs or given a snapshot of an evolving graph, where one does not have to know the order in which the nodes were attached, thus making the error bound applicable to graphs in a larger set of applications.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent as follow:

1. A method for extending a partially labeled data graph to unlabeled nodes in a single network classification, comprising:
   constructing a weight matrix for data in a single network classification, wherein the weight matrix uses a modified graph Laplacian based regularization framework;
   partitioning edges of the data graph into categories;
   assigning a weight to each category;
   assigning to each edge the weight that is a conical combination of a weight based on affinity of attribute values of nodes connected to said edge;
   applying the weight matrix to the data; and
   applying a graph transduction method to the weighted data to generate labels for the unlabeled nodes.

2. A method as in claim 1, wherein the categories are
   edges between nodes with the same label;
   edges between nodes with opposite labels;
   edges between unlabeled nodes;
   edges between an unlabeled node and a node with a label 1; and
   edges between an unlabeled node and a node with a label −1.

3. A method as in claim 2, wherein edges between unlabeled nodes are assigned a weight denoting an expectation based on a distribution of edges that have labels.

4. A method as in claim 2, wherein edges between an unlabeled node and a labeled node are assigned a weight denoting an expectation based on a distribution of edges that have labels, said distribution being limited to those edges having one node equal to the labeled node.

5. A method as in claim 1, wherein applying a graph transduction method further comprises imposing a tradeoff between a fitting accuracy of a prediction function on labeled data and a smoothness of the prediction function over the graph.

6. A method as in claim 5, further comprising
estimating the smoothness of the prediction function for the graph Laplacian based regularization framework; and
modifying the prediction function to ensure compatibility between the graph transduction method and the graph Laplacian based regularization framework.

7. A system for extending a partially labeled data graph to unlabeled nodes in a single network classification, comprising:
a weight matrix for data in a single network classification, wherein the weight matrix uses a modified graph Laplacian based regularization framework;
means for partitioning edges of the data graph into categories;
means for assigning a weight to each category;
means for assigning to each edge the weight that is a conical combination of a weight based on affinity of attribute values of nodes connected to said edge;
means for applying the weight matrix to the data;
a graph transduction method applied to the weighted data to generate labels for the unlabeled nodes.

8. A system as in claim 7, wherein the categories are
edges between nodes with the same label;
edges between nodes with opposite labels;
edges between unlabeled nodes;
edges between an unlabeled node and a node with a label 1; and
edges between an unlabeled node and a node with a label −1.

9. A system as in claim 8, wherein edges between unlabeled nodes are assigned a weight denoting an expectation based on a distribution of edges that have labels.

10. A system as in claim 8, wherein edges between an unlabeled node and a labeled node are assigned a weight denoting an expectation based on a distribution of edges that have labels, said distribution being limited to those edges having one node equal to the labeled node.

11. A system as in claim 7, wherein a graph transduction method is applied by imposing a tradeoff between a fitting accuracy of a prediction function on labeled data and a smoothness of the prediction function over the graph.

12. A system as in claim 11, further comprising
means for estimating the smoothness of the prediction function for the graph Laplacian based regularization framework; and
means for modifying the prediction function to ensure compatibility between the graph transduction method and the graph Laplacian based regularization framework.

13. A computer implemented system for extending a partially labeled data graph to unlabeled nodes in a single network classification, comprising:
a computer processor for executing computer code;
first computer code for constructing a weight matrix for data in a single network classification, wherein the weight matrix uses a modified graph Laplacian based regularization framework;
second computer code for partitioning edges of the data graph into categories;
third computer code for assigning a weight to each category;
fourth computer code for assigning to each edge the weight that is a conical combination of a weight based on affinity of attribute values of nodes connected to said edge;
fifth computer code for applying the weight matrix to the data; and
sixth computer code for applying a graph transduction method to the weighted data to generate labels for the unlabeled nodes.

* * * * *